United States Patent [19]
Choquet

[11] Patent Number: 5,733,060
[45] Date of Patent: Mar. 31, 1998

[54] DEVICE FOR MOUNTING OBJECTS, PARTICULARLY IN THE PASSENGER COMPARTMENT OF A VEHICLE

[75] Inventor: Alain Choquet, Gondecourt, France

[73] Assignee: Reydel Société Anonyme, Gondecourt, France

[21] Appl. No.: 700,378

[22] PCT Filed: Dec. 28, 1995

[86] PCT No.: PCT/FR95/01752

§ 371 Date: Aug. 15, 1996

§ 102(e) Date: Aug. 15, 1996

[87] PCT Pub. No.: WO96/20849

PCT Pub. Date: Jul. 11, 1996

[30] Foreign Application Priority Data

Dec. 29, 1994 [FR] France .................... 94 15992

[51] Int. Cl.⁶ .................. B60N 2/46; B60N 3/02; B60N 3/08; B60N 3/10
[52] U.S. Cl. .................. 403/393; 403/353; 296/37.13
[58] Field of Search .................. 403/393, 353, 403/331, 326, 327; 296/37.9, 37.13; 224/554, 548, 557

[56] References Cited

U.S. PATENT DOCUMENTS

| | | | |
|---|---|---|---|
| 1,571,762 | 2/1926 | Driscoll | 224/557 X |
| 1,790,977 | 2/1931 | De Boer | 224/557 X |
| 2,621,357 | 12/1952 | Stuman | 403/353 X |
| 2,922,515 | 1/1960 | Barnes | 224/557 X |
| 2,999,125 | 9/1961 | Young | 403/353 X |
| 3,288,192 | 11/1966 | Bollinger | 403/353 X |
| 4,645,157 | 2/1987 | Parker | 248/311.2 |
| 4,728,018 | 3/1988 | Parker | 224/273 |
| 5,180,089 | 1/1993 | Suman et al. | 224/557 X |
| 5,337,677 | 8/1994 | Peeno | 108/45 |

FOREIGN PATENT DOCUMENTS

| | | |
|---|---|---|
| 2542567 | 4/1977 | Germany . |
| 3118427 | 11/1982 | Germany . |

*Primary Examiner*—Anthony Knight
*Attorney, Agent, or Firm*—Harrison & Egbert

[57] ABSTRACT

A device for mounting objects such as a cupholder, a case for glasses, an ashtray, or other items, on a support with an inner surface and an aesthetically pleasing outer surface formed in the passenger compartment of a vehicle. The mounting device includes an opening provided in the support, a projection secured to the object to be mounted and designed to be releasably inserted through the opening and at least partially into the space behind the support, a holder so as to retain at least part of the projection against the inner surface of the support in order to stabilize the object.

8 Claims, 1 Drawing Sheet

DEVICE FOR MOUNTING OBJECTS, PARTICULARLY IN THE PASSENGER COMPARTMENT OF A VEHICLE

TECHNICAL FIELD

The present invention relates to a device for mounting objects such as, for example, cup holders, spectacle holders, ashtrays or the like, intended, in particular, for internally equipping a vehicle. It can thus be applied, for example, in the field of fittings for passengers.

BACKGROUND ART

At the present time, various solutions are known for mounting objects, for example in a vehicle. One of them is to use magnets. Nonetheless, their use in fixing objects is not always satisfactory.

In addition, they necessitate the presence of metal surfaces, whereas preference is not given to such materials, by reason, in particular, of their weight, and of the noise they make, particularly in the field of transport.

As regards vehicles, another solution, often put into practice by the users or passengers themselves, is to fix support points, such as hooks, bars or the like, for example by cementing, screwing or rivetting. However, this solution deteriorates the surface on which they are provided and detracts from its aesthetic appearance.

Additionally, these mounting points are often installed to the detriment of functions performed by neighboring items. They thus adversely affect the ergonomic qualities of the vehicle, and sometimes the safety of the passengers.

Finally, such support points have the drawback of not being removable. They thus remain a fixture even if the passengers no longer wish to use them.

The object of the present invention is to provide a device which remedies the aforementioned drawbacks and enables objects to be mounted on any type of surface, whatever its material, that is to say metal and/or synthetic material and/or some other material, without affecting the aesthetic appearance of the surface.

Another object of the present invention is to provide a device for mounting objects that blends in harmoniously with its environment and contributes to the aesthetic appearance of the surface on which it is placed. Thus, according to the invention, there is formed a mounting area which, however, if it is not used, is not perceptible and does not detract from the aesthetic appearance.

Another object of the present invention is to provide a device for mounting objects that does not adversely affect the functions performed by the neighboring items.

A further object of the present invention is to provide a device for mounting objects that is detachable so that it can easily be removed if the user no longer wishes to use it, without leaving any traces of fixing.

Another object of the present invention is to provide a device for mounting objects that ensures reliable fixing thereof so that they cannot, in particular in the case of applications in the field of transport, be transformed into projectiles, in the event of an accident.

Further objects and advantages of the present invention will emerge in the course of the following description, which is given solely by way of example and is not intended to limit it.

SUMMARY OF THE INVENTION

The present invention relates to a device for mounting objects, such as, for example, cup holders, spectacle holders, ashtrays or the like on a support including an inner face and an outer face of aesthetic appearance, intended in particular for internally equipping a vehicle, comprising:

an opening, provided in the support;

a projection fixed to the object that it is wished to mount and suitable for being inserted, removably, through the opening, at least partially behind the support;

means for holding the projection, at least partially, against the rear face of the support to ensure the stability of the object.

The invention will be more readily understood with reference to the following description, as well as to the annexed drawings which form an integral part thereof.

DETAILED DESCRIPTION OF THE INVENTION

The present invention relates to a device for mounting objects such as, for example, cup holders, spectacle holders, ashtrays or the like, intended in particular for internally equipping a vehicle. It can thus be applied, for example, to the field of fittings for passengers.

However, such applications are not limitative and the present invention can be used in all sectors of economic activity in which one has cause to mount objects, whatever their size, shape or functions, and for which it is wished to preserve an impeccable aesthetic appearance if mounting is not carried out.

In the case of applications to the internal equipping of a vehicle, the mounting device according to the invention can be provided, for example, on door panels, uprights, the dashboard or, more generally, on any surface on which it is wished to mount objects.

As regards the latter, the present invention can be applied to objects such as, for example, receptacles such as, in particular, cup holders, spectacle holders, ashtrays or the like. They may also be objects having an aesthetic function and/or audio, video or telephone apparatus or the like.

Figure 1:
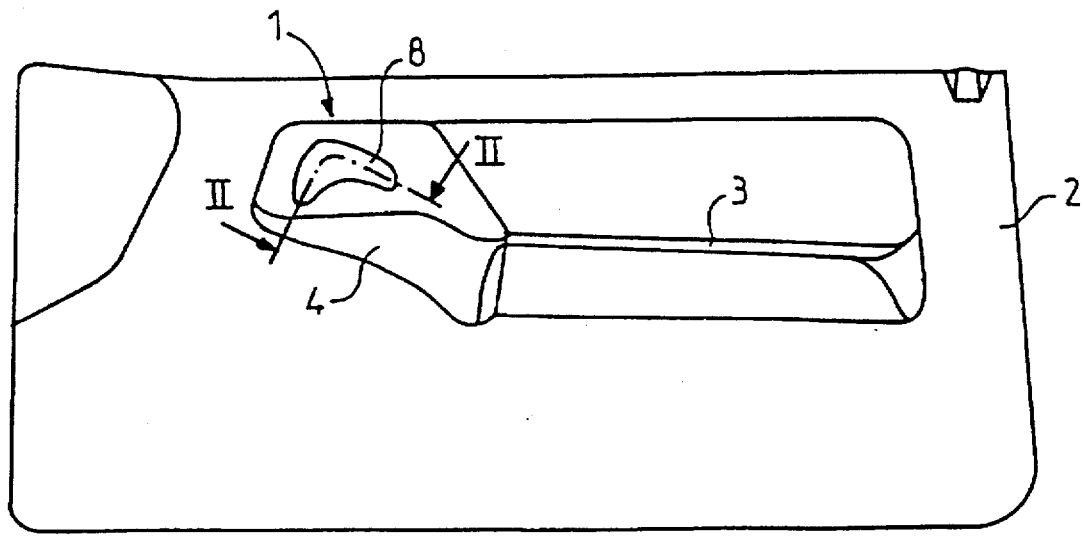
FIG. 1 is a front view of a exemplary embodiment of an opening of an mounting device according to the invention, provided according to one example of application, on a vehicle door.

FIG. 1 illustrates an example of a device 1, according to the invention, for mounting objects on a support 2, such as the door panel of a vehicle. This panel has, for example, an elbow rest 3 provided with an additional thickness 4 on which, for example, is located mounting device 1.

Figure 2:
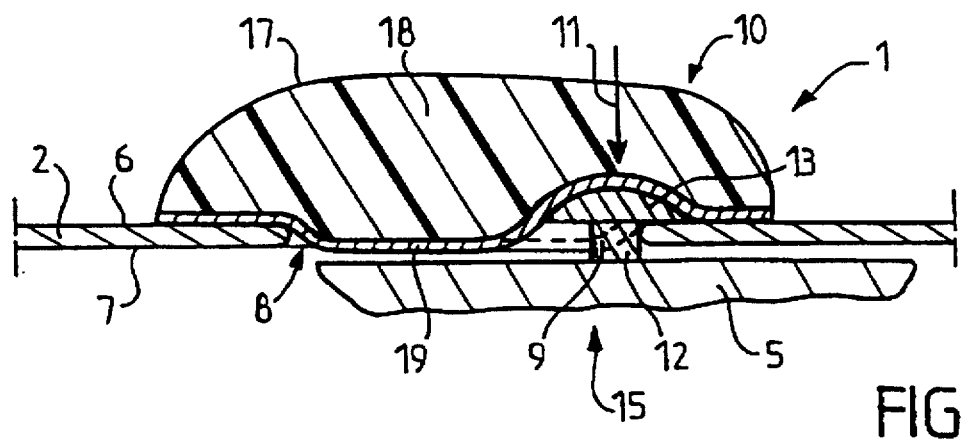
FIG. 2 is a cross-sectional view, along line II—II shown in FIG. 1, of an example of an mounting device according to the invention.

FIG. 2 shows, in detail, an exemplary embodiment of device 1 for mounting objects 5 on support 2. The latter includes, for example, an inner face 6, in particular concealed, and an outer face 7, in particular visible, of aesthetic appearance.

In the event of the invention applying to vehicle doors, support 2 is formed, for example, by a multilayer panel including a rigidifying core, and a skin presenting, in particular, a pleasant visual appearance and the strength necessary for its purpose.

Support 2 thus forms, for example, a fixed item for mounting purposes.

According to the invention, the mounting device is formed by an opening 8, provided in the support 2, as well as by a projection 9, fixed to the object 5 that it is wished to mount. Projection 9 is also capable of being inserted, removably, through opening 8, at least partially behind support 2.

The mounting device is also formed by means 10 for holding projection 9, at least partially, against the inner face 6 of support 2, to ensure the stability of the object.

The means 10 for holding projection 9 are, for example, placed so as to be sandwiched between support 2 and a panel, not shown, provided substantially parallel to the latter. In the event of the invention being used on vehicle doors, the panel is formed, for example, by the actual panel of the door.

According to the invention, holding means 10 exert a pressure, represented by arrow 11, on projection 9. They thus hold the latter by friction against the inner face 6 of support 2.

According to a particular form of embodiment of the invention, projection 9 includes a pin 12 having, at one of its ends, a head 13. At the other of its ends, pin 12 is integral, directly or indirectly, with the object 5 that it is wished to mount.

The corresponding projection 9 is, in particular, rigid. It is formed, for example, by materials such as metals, metallic alloys, synthetic materials such as in particular, polyamide, or the like.

Figure 3:
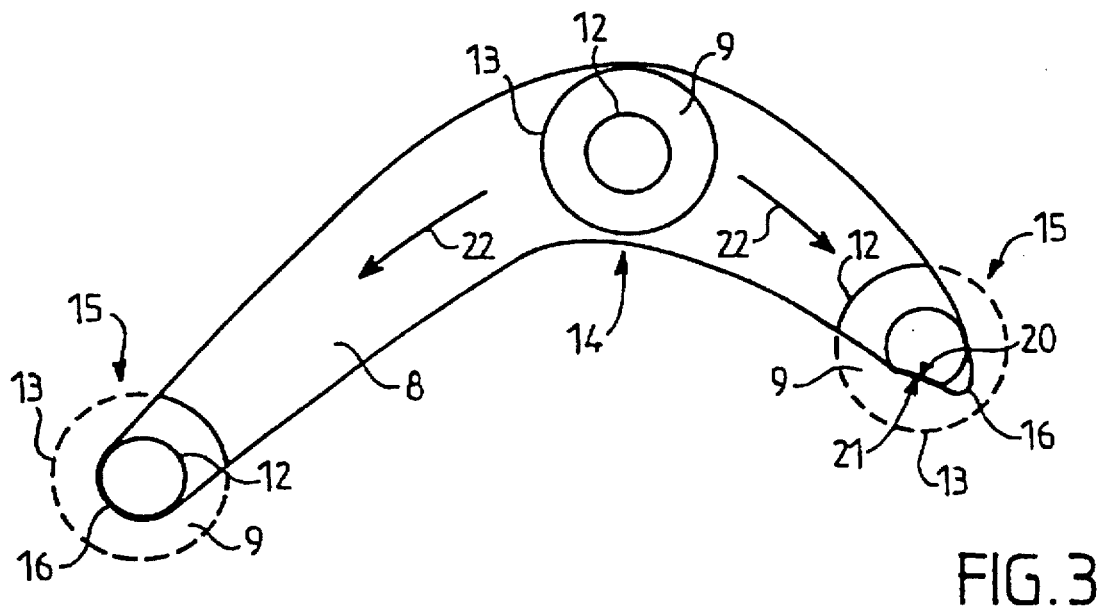
FIG. 3 is a front view illustrating cooperation between an opening and projections of an mounting device according to the invention.

In FIG. 3, it will be noted that opening 8 includes at least a first area 14 having a cross-section that is wider than that of head 13 of projection 9. This makes it possible to insert the head 13 through the opening 8 to place it on the inner face side 6 of support 2.

In addition, the opening also has at least one second area 15 having a cross-section that is smaller than head 13 so as to enable the head 13 to be pressed, from the rear, at least partially, onto inner face 6 of support 2 in the vicinity of the second area 15.

According to one particular form of embodiment, opening 8 is oblong in shape and the second area 15 is provided at at least one of its ends 16.

More precisely, according to the example shown, opening 8 is of a bent oblong shape and has, at each of its ends 16, a second area 15 where projection 9 is blocked.

Of course, opening 8 can have other shapes provided with one or more first areas 14 and with one or more second areas 15, such as, for example, an I shape, an M shapes a star shape or the like, to suit any particular decorative purposes.

As shown, the cross-section of the second area 15, is, for example, substantially identical with that of pin 13, the object of this being to improve the fixing of object 5 to the support 2.

Referring once more to FIG. 2, it will be noted that means 10 for holding projection 9 are formed, for example, by an insert 17, in particular, of an elastically deformable material 18. The latter is composed, for example, of a cellular synthetic foam, in particular polypropylene.

The insert is of a thickness determined according to the space available behind support 2 and to the thickness of head 13 of projection 9. It can vary, for example, in the event of the invention being applied to vehicle door panels, between 0.5 and 2 cm.

According to the invention, insert 17 is placed, for example, at least in the vicinity of and behind opening 8. In addition, it is covered, at least partially, by a skin 19 of aesthetic appearance, in particular over the entire surface of the opening 8, as well as in the vicinity of its contour.

Skin 19 is formed, for example, by a textile material. In the event of the invention being used on a door panel, the same trim can be used as in the rest of the vehicle, so as to enhance the aesthetic appearance.

Thus, When the mounting device is not in use, support 2 reveals skin 19 through opening 8. The aesthetic appearance of the support 2 as a whole is thus preserved, which is not the case of the other mounting devices.

Furthermore, in order to be able to replace insert 17 in the event of wear or of skin 19 becoming soiled, or of changing the trim of support 2, or for some other reason, the insert 17 is, in particular, interchangeable. For this purpose, skin 19, which is placed in contact with the inner face 6 of support 2, is fixed to the latter solely by friction and is designed to withstand friction.

According to the particular form of embodiment represented, head 13 of projection 9 is substantially hemispherical in shape. The cross-section of head 13 is wider than that of pin 12 so as to form a constriction to cooperate with the support. Other shapes can also be contemplated, such as, for example, a polygonal head 13.

Referring once again to FIG. 3, it will be noted that pin 12 of projection 9 comprises at least one flat portion 20, suitable for cooperating with at least one corresponding, substantially rectilinear portion 21 provided on the contour of opening 8 so as to limit axial rotation of the projection 9.

In order to limit rotation and to ensure better stability of mounted object 5, one could also contemplate associating two mounting devices according to the invention, substantially parallel to one another, that is to say to providing, in particular, two openings 8 in the same support 2, orientated in the same direction.

The mounting device according to the invention is used, for example, as follows. First of all, projection 9 is inserted, by its head 13, into opening 8 at the first area 14. Deformable insert 17 is pressed on to enable the head 13 to pass behind inner face 6 of support 3, and projection 9 is moved, in the direction of arrows 22, towards one of areas 15, where projection 9 is blocked, in particular as a result of the pressure exerted by insert 17 on its head 13. Object 5 is then reliably mounted on support 2.

Other embodiments of the present invention, within the grasp of a man of the art, could, of course, have been contemplated without thereby departing from the scope of the present application.

I claim:

1. A device for mounting an object on a support including an inner face and an outer face for internally equipping a vehicle, comprising:

an opening provided in the support;

a projection fixed to the object, said projection being removably inserted through said opening, at least partially behind the support;

a means for holding said projection, at least partially against the inner face of the support for ensuring a stability of the object, said means for holding being formed by an insert of elastically deformable material, said insert being covered at least partially by a skin over an entire surface of said opening and in a vicinity of a contour of said insert.

2. The device according to claim 1, wherein the projection includes a pin having at one end a head, said pin being integral at another end with the object.

3. The device according to claim 2, wherein the opening includes at least one first area having a cross-section wider than a cross-section of the head of the projection, so as to enable said head to be inserted through said opening, and at least one second area having a cross-section smaller than said head so as to enable said head to be pressed from the rear at least partially onto the inner face of the support in the vicinity of said second area.

4. The device according to claim 3, wherein the cross-section of said second area is substantially identical with that of the pin.

5. The device according to claim 3, wherein said opening is oblong in shape and said second area is provided at one of the ends.

6. The device according to claim 2, wherein the head of the projection is substantially hemispherical in shape.

7. The device according to claim 2, wherein the pin of the projection comprises at least one flat portion suitable for cooperating with at least one corresponding substantially rectilinear portion provided on a contour of the opening so as to limit axial rotation of said projection.

8. The device according to claim 1, wherein the elastically deformable insert is interchangeable.

* * * * *